United States Patent
Guan

(10) Patent No.: US 10,212,700 B2
(45) Date of Patent: *Feb. 19, 2019

(54) METHOD FOR RECEIVING AND SENDING CONTROL CHANNEL, USER EQUIPMENT AND BASE STATION

(71) Applicant: Huawei Technologies Co., Ltd., Shenzhen, Guangdong (CN)

(72) Inventor: Lei Guan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/461,157

(22) Filed: Mar. 16, 2017

(65) Prior Publication Data

US 2017/0188346 A1    Jun. 29, 2017

Related U.S. Application Data

(63) Continuation of application No. 14/267,372, filed on May 1, 2014, now Pat. No. 9,622,220, which is a
(Continued)

(30) Foreign Application Priority Data

Nov. 4, 2011  (CN) .......................... 2011 1 0346048
Jan. 10, 2012  (CN) .......................... 2012 1 0006086

(51) Int. Cl.
*H04W 72/04* (2009.01)
*H04L 5/00* (2006.01)

(52) U.S. Cl.
CPC ......... *H04W 72/042* (2013.01); *H04L 5/0051* (2013.01); *H04L 5/0053* (2013.01);
(Continued)

(58) Field of Classification Search
CPC .................................................. H04W 72/042
See application file for complete search history.

(56) References Cited

U.S. PATENT DOCUMENTS

2009/0154607 A1    6/2009  Lindoff et al.
2009/0197542 A1    8/2009  Buckley et al.
(Continued)

FOREIGN PATENT DOCUMENTS

CN    101860896 A    10/2010
CN    102158979 A    8/2011
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 v10.3.0, Sep. 2011, 103 pages.
(Continued)

*Primary Examiner* — Ayanah S George

(57) ABSTRACT

The present invention discloses methods for receiving and sending a control channel, user equipment, and a base station. The method for receiving a control channel includes: obtaining time-frequency resource information and first information of the control channel; determining a search space of the control channel according to the time-frequency resource information and the first information; and receiving the control channel in the search space. By using the methods, the user equipment and the base station according to embodiments of the present invention, the search space of the control channel can be determined according to the time-frequency resource information and the first information of the control channel, so that receiving and sending of the control channel can be implemented and a capacity of the control channel can be expanded, thereby improving system
(Continued)

scheduling efficiency and flexibility and further improving user experience.

12 Claims, 8 Drawing Sheets

Related U.S. Application Data continuation of application No. PCT/CN2012/077829, filed on Jun. 29, 2012.

(52) U.S. Cl.
CPC ... *H04W 72/0406* (2013.01); *H04W 72/0446* (2013.01); *H04W 72/0453* (2013.01); *H04L 5/0048* (2013.01)

(56) References Cited

U.S. PATENT DOCUMENTS

| | | | |
|---|---|---|---|
| 2010/0279628 A1* | 11/2010 | Love | H04L 5/003 455/70 |
| 2010/0331030 A1* | 12/2010 | Nory | H04L 5/0053 455/509 |
| 2011/0069637 A1 | 3/2011 | Liu et al. | |
| 2011/0103509 A1* | 5/2011 | Chen | H04L 5/0007 375/295 |
| 2013/0016653 A1 | 1/2013 | Kim et al. | |
| 2013/0044664 A1 | 2/2013 | Nory | |
| 2013/0044727 A1 | 2/2013 | Nory | |

FOREIGN PATENT DOCUMENTS

| | | | | |
|---|---|---|---|---|
| CN | 102170703 A | 8/2011 | | |
| EP | 2 378 703 A1 | 10/2011 | | |
| EP | 2378703 A1 * | 10/2011 | ........... | H04L 5/0007 |
| EP | 2378703 A1 * | 10/2011 | ........... | H04L 5/0007 |
| JP | 20130518502 A | 5/2013 | | |
| JP | 2013-529414 | 7/2013 | | |
| JP | 2014527344 A | 10/2014 | | |
| WO | WO 2011/093644 A2 | 8/2011 | | |
| WO | WO 2011/124028 A1 | 10/2011 | | |
| WO | WO 2011/128013 A1 | 10/2011 | | |
| WO | WO 2011/129537 A2 | 10/2011 | | |

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP TS 36.213 v10.3.0, Sep. 2011, 122 pages.
"Discussion on ePDCCH Design Issues", Samsung, 3GPP TSG-RAN1 #66 meeting, Aug. 22-26, 2011, 4 pages.
"Design Consideration for E-PDCCH", Research in Motion, UK Limited, 3GPP TSG RAN WG1 Meeting #66 bis, Oct. 10-14, 2011, 6 pages.
"Initial system level performance comparison of Enhanced-PDCCH and PDCCH", Panasonic, 3GPP TSG RAN WG1 Meeting #66, Aug. 22-26, 3011, 5 pages, R1-112366.
"PDCCH search space design in LTE-A", CATT, 3GPP TSG RAN WG1 Meeting #61bis, Jun. 28-Jul. 2, 2010, 5 pages.
"Aspects on DL control signaling enhancements", ZTE, TSG-RAN WG1 #65, May 9-13, 2011, 4 pages.
"E-PDCCH resource management", Pantech, 3GPP TSG RAN Working Group 1 Meeting #66, Aug. 22-26, 2011, 3 pages.

* cited by examiner

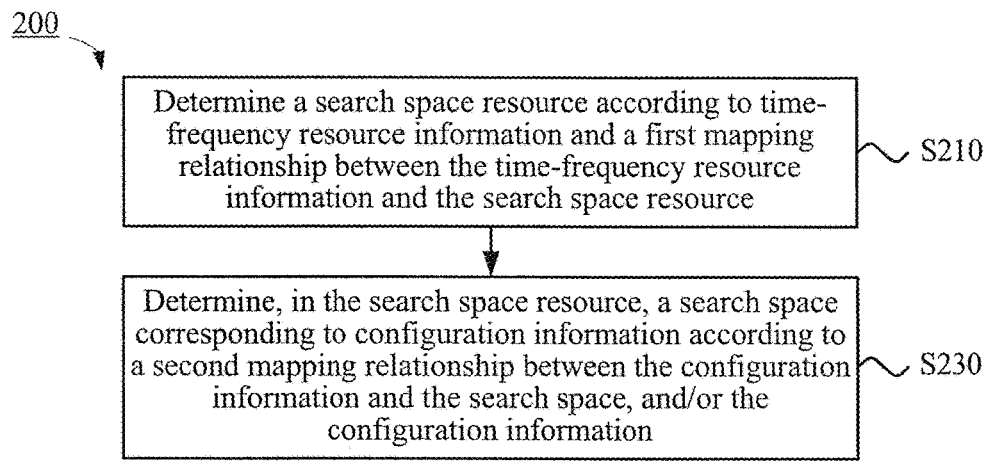

FIG. 4B

| | | Downlink data or time-frequency resource of an E-PDCCH of another UE | | |
|---|---|---|---|---|
| Conventional control channel area | RB 0 | A1. Antenna port 7 | Antenna port 8 | Time-frequency resource of an E-PDCCH |
| | | Antenna port 8 | D2. Antenna port 7 | |
| | RB 1 | B1. Antenna port 7 | Antenna port 8 | |
| | | Antenna port 8 | E2. Antenna port 7 | |
| | RB 2 | C1. Antenna port 7 | Antenna port 8 | |
| | | Antenna port 8 | F2. Antenna port 7 | |
| | ⋮ | ⋮ | ⋮ | |
| | RB N-3 | D1. Antenna port 7 | Antenna port 8 | |
| | | Antenna port 8 | A2. Antenna port7 | |
| | RB N-2 | E1. Antenna port7 | Antenna port 8 | |
| | | Antenna port 8 | B2. Antenna port 7 | |
| | RB N-1 | F1. Antenna port 7 | Antenna port 8 | |
| | | Antenna port 8 | C2. Antenna port 7 | |
| | | Downlink data or time-frequency resource of an E-PDCCH of another UE | | |

FIG. 5

METHOD FOR RECEIVING AND SENDING CONTROL CHANNEL, USER EQUIPMENT AND BASE STATION

CROSS-REFERENCE TO RELATED APPLICATIONS

This application is a continuation of U.S. patent application Ser. No. 14/267,372, filed on May 1, 2014, which is a continuation of International Application No. PCT/CN2012/077829, filed on Jun. 29, 2012. The International Application claims priority to Chinese Patent Application No. 201110346048.4, filed on Nov. 4, 2011 and Chinese Patent Application No. 201210006086.x, filed on Jan. 10, 2012. All of the afore-mentioned patent applications are hereby incorporated by reference in their entireties.

TECHNICAL FIELD

The present invention relates to the field of communications, and in particular, to methods for receiving and sending a control channel, a user equipment and a base station in the field of communications.

BACKGROUND

In a Long Term Evolution (LTE) system, a minimum time unit for scheduling by an evolved base station (eNB) is a subframe, each subframe includes 2 timeslots, and each timeslot further includes 7 symbols. For a user equipment (UE) scheduled in a subframe, the subframe includes a physical downlink control channel (PDCCH) of the UE. The PDCCH is used to carry scheduling information of the scheduled UE, and the scheduling information includes information such as a physical channel resource allocated for the UE and a specifically used modulation and coding scheme (MCS).

In a current LTE system, a PDCCH and a physical downlink shared channel (PDSCH) exist in a subframe in a time division manner, where the PDCCH is carried in first n symbols of the subframe, and n may be one of 1, 2, 3, and 4; and mapping of downlink data scheduled over the PDSCH starts from an (n+1)th symbol of the subframe. In a frequency domain, the PDCCH and the PDSCH are scattered, after interleaving processing, on bandwidths of the whole system to obtain frequency diversity gains. After performing demodulation and decoding on the PDCCH according to a payload size and an aggregation level of the PDCCH based on a cell-specific reference signal (CRS) and in a search space of the PDCCH, a UE uses a UE-specific radio network temporary identity (RNTI) or identity to descramble cyclical redundancy check (CRC) to check and determine the PDCCH of the UE, and performs corresponding receiving or sending processing, according to scheduling information in the PDCCH, on data scheduled over the PDCCH.

In an LTE system of a current or a subsequent version, introduction of technologies, such as multi-user multiple input multiple output (MIMO) and coordinated multiple points (CoMP), causes a limit on a capacity of a control channel; therefore, a PDCCH based on transmission in an MIMO precoding manner, namely, an enhanced physical downlink control channel (E-PDCCH) is introduced. The UE may demodulate the E-PDCCH based on a UE-specific reference signal (UERS).

The UERS demodulation manner is introduced in the transmission of the E-PDCCH; therefore, a suitable solution is required for implementing receiving and sending of the control channel.

SUMMARY

Embodiments of the present invention provide methods for receiving and sending a control channel, a user equipment and abase station, which can implement receiving and sending of the control channel.

According to one aspect, an embodiment of the present invention provides a method for receiving a control channel, and the method includes: obtaining time-frequency resource information and first information of the control channel; determining a search space of the control channel according to the time-frequency resource information and the first information; and receiving the control channel in the search space.

According to another aspect, an embodiment of the present invention provides a method for sending a control channel, and the method includes: obtaining time-frequency resource information and first information of the control channel; determining a search space of the control channel according to the time-frequency resource information and the first information; and sending to a user equipment the control channel in the search space.

According to still another aspect, an embodiment of the present invention provides a user equipment, and the user equipment includes: an obtaining module, configured to obtain time-frequency resource information and first information of a control channel; a determining module, configured to determine a search space of the control channel according to the time-frequency resource information and the first information obtained by the obtaining module; and a receiving module, configured to receive the control channel in the search space determined by the determining module.

According to still another aspect, an embodiment of the present invention provides a base station, and the base station includes: an obtaining module, configured to obtain time-frequency resource information and first information of a control channel; a determining module, configured to determine a search space of the control channel according to the time-frequency resource information and the first information obtained by the obtaining module; and a first sending module, configured to send to a user equipment the control channel in the search space determined by the determining module.

Based on the foregoing technical solutions, by using the methods for receiving and sending the control channel, the user equipment and the base station according to the embodiments of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 4A and FIG. 4B are each a schematic flowchart of a method for determining a search space according to an embodiment of the present invention;

FIG. 5 is a schematic mapping diagram of a search space according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions of the embodiments of the present invention may be applied in various communication systems, for example: Global System of Mobile Communication (GSM), Code Division Multiple Access (CDMA) system, Wideband Code Division Multiple Access (WCDMA) system, general packet radio service (CPRS), Long Term Evolution (LTE) system, LTE frequency division duplex (FDD) system, LTE time division duplex (TDD), Universal Mobile Telecommunication System (UMTS), Worldwide Interoperability for Microwave Access (WiMAX) communication system and the like.

It should also be understood that in the embodiments of the present invention, user equipment (UE) may be referred to as a terminal (Terminal), a mobile station (MS), a mobile terminal and the like, and the user equipment may communicate with one or more core networks by using a radio access network (RAN). For example, the user equipment may be a mobile phone (or referred to as a "cellular" phone), a computer with a mobile terminal and the like; for example, the user equipment may also be a portable, pocket-sized, handheld, computer-embedded, or vehicle-mounted mobile apparatus, which exchanges voice and/or data with the radio access network.

In the embodiments of the present invention, a base station may be a base station (Base Transceiver Station, BTS) in the GSM or CDMA, may also be a base station (NodeB, NB) in the WCDMA, and may further be an evolved base station (ENB or e-NodeB) in the LTE; the present invention is not limited thereto. For ease of description, a base station eNB and a user equipment UE are used as an example in the following embodiments.

Figure 1:
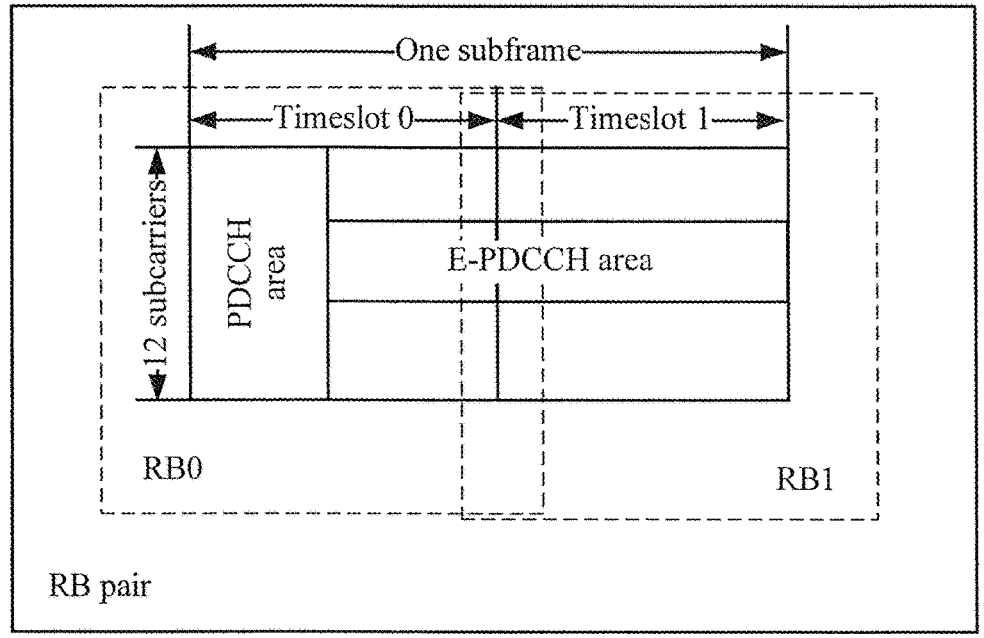
FIG. 1 is a schematic block diagram of resource blocks and a resource block pair according to an embodiment of the present invention.

It should be understood that an E-PDCCH is located in an area for downlink data transmission in a subframe and is not in a control area of first n symbols in the subframe, and the E-PDCCH and a PDSCH are located in the area for downlink data transmission in a frequency division manner, that is, the E-PDCCH and the PDSCH occupy different resource blocks (RB). For example, an E-PDCCH at an aggregation level of 1, 2, 4 or 8 respectively needs to occupy 1, 2, 4 or 8 RBs. As shown in FIG. 1, an RB occupies 12 subcarriers in a frequency domain and occupies half a subframe, namely one timeslot, in a time domain, for example, RB0 occupies timeslot 0, and RB1 occupies timeslot 1; an RB pair occupies 12 subcarriers in the frequency domain, the same as an RB, but occupies a complete subframe in the time domain.

Figure 2:
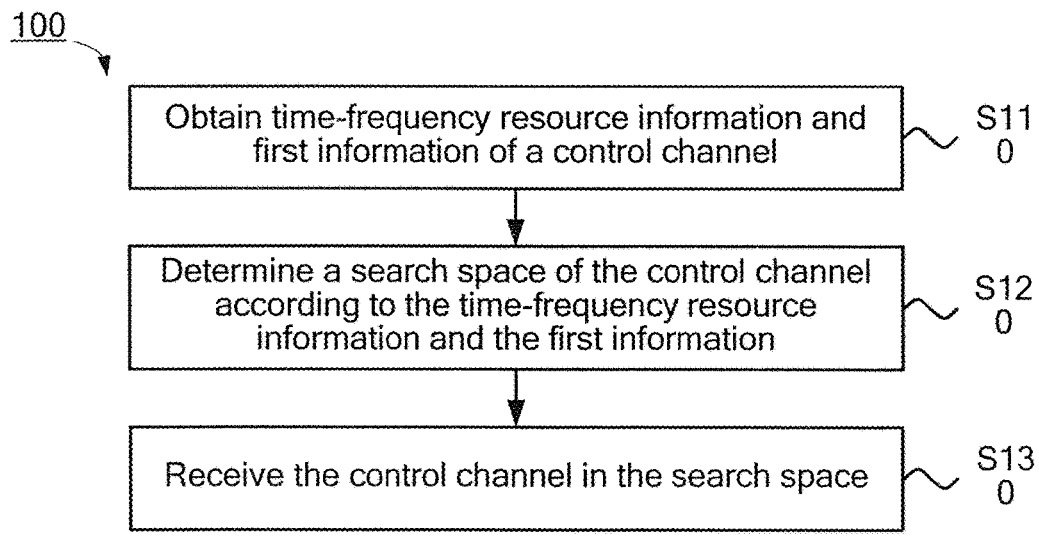
FIG. 2 is a schematic flowchart of a method for receiving a control channel according to an embodiment of the present invention.

FIG. 2 is a schematic flowchart of a method 100 for receiving a control channel according to an embodiment of the present invention. As shown in FIG. 2, the method 100 includes:

S110: Obtain time-frequency resource information and first information of the control channel.

S120: Determine a search space of the control channel according to the time-frequency resource information and the first information.

S130: Receive the control channel in the search space.

To receive a control channel, a user equipment may obtain time-frequency resource information and first information of the control channel, determine a search space of the control channel according to the time-frequency resource information and the first information, and then receive the control channel in the search space of the control channel.

Therefore, by using the method for receiving the control channel according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

In the embodiment of the present invention, it should be understood that the receiving, by the user equipment, the control channel in the search space may include: performing, by the user equipment, blind detection in the determined search space of the control channel and receiving the control channel after detecting the control channel of the user equipment. It should also be understood that, after receiving the control channel, the user equipment may perform, according to control signaling carried by the control channel, data receiving or sending by using a data channel indicated by the control signaling.

It should be understood that a control channel including an enhanced physical downlink control channel E-PDCCH is used as an example for description in the embodiment of the present invention, but the embodiment of the present invention is not limited thereto.

Figure 3:
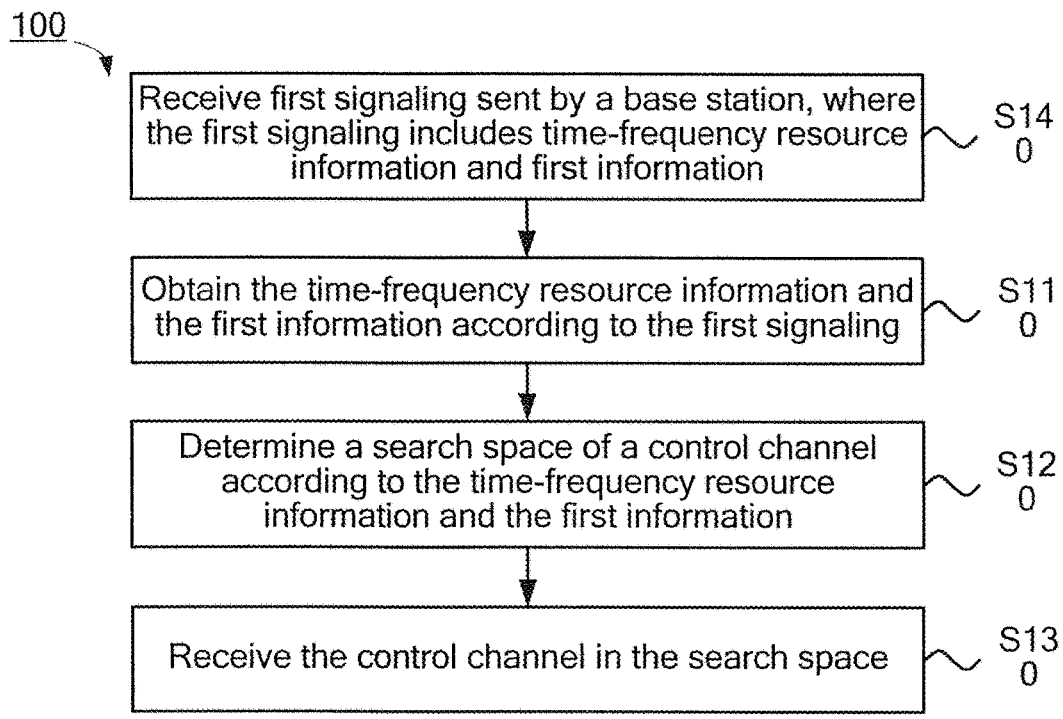
FIG. 3 is another schematic flowchart of a method for receiving a control channel according to an embodiment of the present invention.

In the embodiment of the present invention, as shown in FIG. 3, the method 100 for receiving the control channel according to the embodiment of the present invention may further include:

S140: The user equipment receives first signaling sent by a base station, where the first signaling includes the time-frequency resource information and the first information.

In this case, S110 specifically includes: obtaining, by the user equipment, the time-frequency resource information and the first information according to the first signaling.

In S140, the first signaling may be high-layer signaling, for example, radio resource control (RRC) signaling or media access control (MAC) signaling; and the first signaling may also be physical layer signaling, for example, PDCCH signaling or other physical layer signaling.

It should be understood that the first signaling may include one piece of signaling or include multiple pieces of signaling, that is, the base station may send, by using one piece of signaling or at least two pieces of signaling, the time-frequency resource information and the first information to the user equipment. When the base station transmits the time-frequency resource information and the first information by using the at least two pieces of signaling, each piece of signaling in the at least two pieces of signaling may carry all or a part of the time-frequency resource information or the first information, and may also carry a part of the time-frequency resource information and the first information; the embodiment of the present invention is not limited thereto.

In S110, the user equipment obtains the time-frequency resource information and the first information. In the embodiment of the present invention, the time-frequency resource information is used to indicate a time-frequency resource of the control channel, for example, the time-frequency resource information may be a set of RBs or RB pairs. When it is used as an example that the time-frequency resource information is a set of RB pairs, the time-frequency resource of the control channel may be a group of RB pairs, including at least one RB pair, and each RB pair in the at least one RB pair may be continuous or discontinuous in physical resources. The E-PDCCH of the user equipment UE may occupy at least one RB or RB pair in the set of RB pairs.

In the embodiment of the present invention, optionally, the first information includes configuration information of a user equipment-specific reference signal UERS, and/or location information of the search space, where the configuration information of the UERS is used for receiving the control channel. It should be understood that the user equipment-specific reference signal UERS is used to demodulate the control channel of the user equipment, and the configuration information of the UERS may include infatuation, such as an antenna port number of the UERS, scrambling code corresponding to an antenna port, and the number of antenna ports.

In S120, the user equipment may determine the search space of the control channel according to the time-frequency resource information and the first information. Optionally, in the embodiment of the present invention, the user equipment may determine the search space of the control channel according to the time-frequency resource information, a first mapping relationship between the time-frequency resource information and a search space resource, and the location information; and the user equipment may also determine the search space corresponding to the configuration information according to the time-frequency resource information, the first mapping relationship between the time-frequency resource information and the search space resource, and the configuration information. Descriptions are given below with reference to FIG. 4A and FIG. 4B separately.

It should be understood that the search space resource may be the search space of the control channel finally obtained by the user equipment, and may also be at least two candidate search spaces of the control channel. When the search space resource is the candidate search spaces of the control channel, the user equipment further needs to finally obtain, in the at least two candidate search spaces included in the search space resource, the search space of the control channel.

Figure 4A:
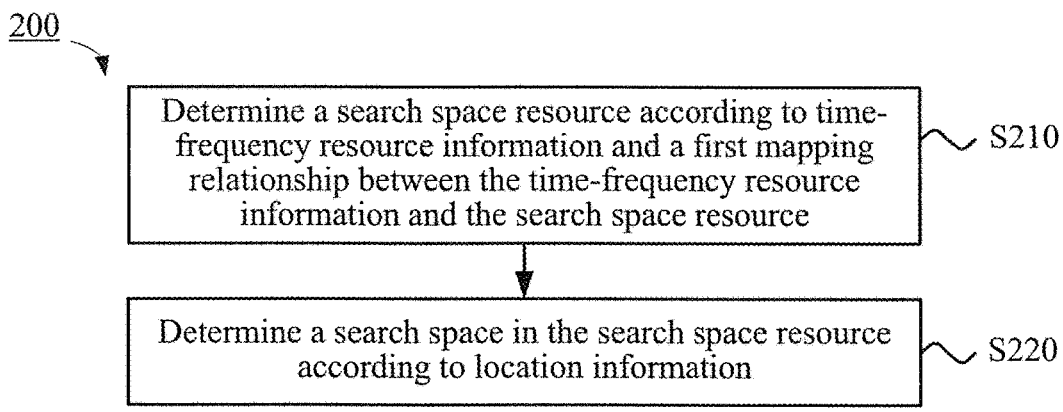

As shown in FIG. 4A, a method 200 for determining the search space of the control channel according to an embodiment of the present invention may include:

S210: The user equipment determines a search space resource according to the time-frequency resource information and a first mapping relationship between the time-frequency resource information and the search space resource.

S220: The user equipment determines, in the search space resource, the search space of the control channel according to the location information.

In S210, the user equipment may determine, according to the time-frequency resource information, a time-frequency resource configured for the user equipment, and may further determine, according to the first mapping relationship between the time-frequency resource information and the search space resource, a rule of mapping the search space resource of the control channel to the configured time-frequency resource, so as to determine the search space resource.

Specifically, assume that the time-frequency resource is a group of RB pairs, including N RB pairs. Sequence numbers of the N RB pairs are, for example, 0, 1, . . . , and N−1, and definitely, the N RB pairs may be mapped to physical resources continuously or discontinuously. For example, a mapping method for the search space resource is that mapping of the search space of the control channel of the UE starts from the $0^{th}$ RB pair in sequence. Using an aggregation level of one RB as an example, candidate E-PDCCH resources in the search space of the control channel of the UE are a first RB in RB pair 0, a second RB in RB pair 0, a first RB in RB pair 1, a second RB in RB pair 1, . . . , and so on. For example, another mapping method for the search space resource is that the search space of the control channel of the UE may adopt a discrete mapping manner. As shown in FIG. 5, using an aggregation level of one RB as an example, candidate E-PDCCH resources in the search space of the control channel are first 3 RB pairs 0, 1, and 2, and last 3 RB pairs N−3, N−2, and N−1 in the configured time-frequency resource. Other mapping relationships at an aggregation level of one RB are not limited herein, and mapping relationships at other aggregation levels are also not limited herein.

In S220, after determining the search space resource, the user equipment may determine, in the search space resource, the search space of the control channel according to the location information included in the first information.

Specifically, an E-PDCCH at an aggregation level of one RB, shown in FIG. 5, is used as an example for description. For example, the UE may obtain, according to RRC signaling, time-frequency resource information of the E-PDCCH and the first information including the location information of the search space. Therefore, the UE may determine the search space of the control channel according to the time-frequency resource information, the first mapping relationship between the time-frequency resource information and the search space resource, and the location information carried in the first signaling.

It should be understood that the first mapping relationship between the time-frequency resource information and the search space resource refers to a manner of mapping the search space resource to the time-frequency resource, namely, a manner of mapping a candidate E-PDCCH in the search space resource of the control channel to the time-frequency resource. One candidate E-PDCCH is used as an example for description in the following. If a part of resources A1 of a candidate control channel A occupy a part of an RB of a first timeslot in RB pair 0, and another part of resources A2 of the candidate control channel A occupy a part of an RB of a second timeslot in RB pair N−3, the RB of the first timeslot in RB pair 0 and the RB of the second timeslot in RB pair N−3 may be regarded as the search space resource. Other mapping relationships are not limited herein. The UE may obtain, by using the location information of the search space in the first signaling, specific location information of the control channel in the search space resource. For example, the UE obtains specific parts of one RB which are separately occupied by the parts of resources A1 and A2 of the candidate control channel, for example, A1 occupies an upper half of the RB and A2 occupies a lower half of the RB.

It should be understood that the first signaling including the location information may belong to the foregoing RRC signaling, and may also be other RRC signaling or physical layer signaling. Besides, other dividing manners of an RB are not limited herein, and control channels at other aggregation levels are also not limited herein.

One candidate E-PDCCH A is further used as an example for description. For example, the search space resource of the E-PDCCH A and obtained by the user equipment according to the time-frequency resource information and the first mapping relationship between the time-frequency resource information and the search space resource includes: a) the RB of the first timeslot or a part of the RB of the first timeslot in RB pair 0 occupied by A1, and the RB of the second timeslot or a part of the RB of the second timeslot in RB pair N−3 occupied by A2; and b) the RB of the second timeslot or a part of the RB of the second timeslot in RB pair 0 occupied by A1, and the RB of the first timeslot or a part of the RB of the first timeslot in RB pair N−3 occupied by A2. The user equipment may further determine, according to the location information, that a final search space is the foregoing a) or b) in the search space resource. Other mapping manners are not limited herein.

As shown in FIG. 4B, the method 200 for determining the search space of the control channel according to an embodiment of the present invention may also include:

S210: The user equipment determines a search space resource according to the time-frequency resource information and a first mapping relationship between the time-frequency resource information and the search space resource.

S230: The user equipment determines, in the search space resource, the search space corresponding to the configuration information according to a second mapping relationship between the configuration information and the search space, and/or the configuration information.

In S230, after determining the search space resource, the UE may determine, in the search space resource, the search space of the control channel corresponding to the configuration information of the UERS of the UE according to the configuration information of the UERS, and/or the second mapping relationship between the configuration information of the UERS and the search space of the E-PDCCH.

It should be understood that the second mapping relationship between the configuration information of the UERS and the search space may be explained as a mapping relationship between the configuration information of the UERS and the corresponding search space, where the mapping relationship is a UE-specific mapping relationship, for example, a search space corresponding to a UERS of an antenna port 7 of UE1 is search space A, and/or, a search space corresponding to a UERS of an antenna port 8 of UE1 is search space B; and a search space corresponding to a UERS of an antenna port 7 of UE2 is search space B, and/or, a search space corresponding to a UERS of an antenna port 8 of UE2 is search space A. In this way, UE1 and UE2 may occupy a search space of the same time-frequency resource in a spatial division manner, thereby increasing utilization of the resource.

The UE may determine the search space of the control channel of the UE according to the configuration information of the UERS of the UE and/or the second mapping relationship. Specifically, if the first mapping relationship includes correspondence between all the configuration information of the UERS and the search space, the second mapping relationship is not needed, and the final search space can be determined in the search space resource only according to the configuration information of the UERS; and if the first mapping relationship includes only the search space resource, the configuration information of the UERS and the second mapping relationship between the configuration information and the search space need to be known to determine the final search space in the search space resource.

For example, if an antenna port 7 is configured for the UERS of the UE, the UE may determine a search space resource including search space A and search space B according to the time-frequency resource information and the first mapping relationship between the time-frequency resource information and the search space resource; and the UE further determines that the search space of the control channel of the UE is search space A in the search space resource according to the configuration information and/or the second mapping relationship between the configuration information and the search space.

It should be understood that the foregoing correspondence or mapping relationship between the search space and the configuration information of the UERS refers to that, if the UE receives an E-PDCCH in the search space based on the configuration information of the UERS of the UE, it may be understood that the search space is a search space corresponding to the configuration information of the UERS of the UE.

Specifically, an E-PDCCH at an aggregation level of one RB, shown in FIG. 5, is used as an example for description. For example, the UE may obtain, according to RRC signaling, time-frequency resource information of the E-PDCCH and first information including the configuration information of the UERS. Therefore, the UE may determine the search space of the control channel according to the time-frequency resource information, the first mapping relationship between the time-frequency resource information and the search space resource, and the configuration information carried in the first signaling.

The UE may further determine a specific search space according to the configuration information of the UERS. For example, the UE obtains specific parts of an RB which are separately occupied by two parts of resources A1 and A2 of the candidate control channel, for example, if the configuration information of the UERS is single-antenna port 7 and scrambling code 0, A1 occupies an upper half of an RB of a first timeslot in RB pair 0 and A2 occupies a lower half of an RB of a second timeslot in RB pair N−3; and if the configuration information of the UERS is single-antenna port 8 and scrambling code 0, A1 occupies a lower half of the RB of the first timeslot in RB pair 0 and A2 occupies an upper half of the RB of the second timeslot in RB pair N−3.

It should be understood that the first signaling including the configuration information may belong to the RRC signaling, and may also be other RRC signaling or physical layer signaling. Other dividing manners of an RB are not limited herein, control channels at other aggregation levels are not limited herein, and configuration information of other UERSs is also not limited herein.

The foregoing method may be further specifically understood that, the user equipment may determine the search space resource according to the time-frequency resource information and the first mapping relationship between the time-frequency resource information and the search space resource. One candidate E-PDCCH is used as an example for description. A part of resources A1 of the candidate control channel A occupy a part of the RB of the first timeslot in RB pair 0, and another part of resources A2 of the candidate control channel A occupy a part of the RB of the second timeslot in RB pair N−3, where the RB of the first timeslot in RB pair 0 and the RB of the second timeslot in RB pair N−3 described herein may be regarded as the search space resource of the candidate E-PDCCH. The user equipment may determine, in the search space resource, the search space of the control channel according to the configuration information of the UERS and/or the second mapping relationship between the configuration information of the UERS and the search space, that is, determine specific parts of one RB pair which are separately occupied by the two parts A1 and A2 of the candidate control channel A. For example, if the configuration information of the UERS is single-antenna port 7 and scrambling code 0, A1 occupies the upper half of the RB of the first timeslot in RB pair 0 and A2 occupies the lower half of the RB of the second timeslot in RB pair N−3; and if the configuration information of the UERS is single-antenna port 8 and scrambling code 0, A1 occupies the lower half of the RB of the first timeslot in RB pair 0 and A2 occupies the upper half of the RB of the second timeslot in RB pair N−3. It may be seen that correspondence exists between the configuration information of the UERS and the search space, that is, the determined search space is a search space corresponding to the configuration information of the UERS.

One candidate E-PDCCH A is further used as an example for description. For example, the search space resource of the E-PDCCH A and obtained by the user equipment according to the time-frequency resource and the first mapping relationship between the time-frequency resource and the search space resource includes: a) the RB of the first timeslot or apart of the RB of the first timeslot in RB pair 0 occupied by A1, and the RB of the second timeslot or a part of the RB of the second timeslot in RB pair N−3 occupied by A2; and b) the RB of the second timeslot or a part of the RB of the second timeslot in RB pair 0 occupied by A1, and the RB of the first timeslot or a part of the RB of the first timeslot in RB pair N−3 occupied by A2. The user equipment may further determine, according to the configuration information of the UERS, and/or the second mapping relationship between the configuration information of the UERS and the search space, that a search space is the foregoing a) or b) in the search space resource. For example, if the configuration information of the UERS is single-antenna port 7 and scrambling code 0, the search space of the control channel is a); and if the configuration information of the UERS is single-antenna port 8 and scrambling code 0, the search space is b). It may be seen that correspondence exists between the configuration information of the UERS and the search space, that is, the determined search space is a search space corresponding to the configuration information of the UERS. Information, such as other mapping manners and the configuration information of the UERS, is not limited herein.

It should be understood that in the embodiments of the present invention, the sequence numbers of the foregoing processes do not indicate an execution sequence. The execution sequence of the processes should be determined based on functions and internal logic thereof, and should not constitute any limitation to the implementation process of the embodiments of the present invention.

Therefore, by using the method for receiving the control channel according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

In the embodiment of the present invention, the user equipment may obtain, by receiving second signaling sent by the base station and/or according to a preset rule, the first mapping relationship and the second mapping relationship, where the second signaling includes the first mapping relationship and/or the second mapping relationship.

Figures 6, 7:
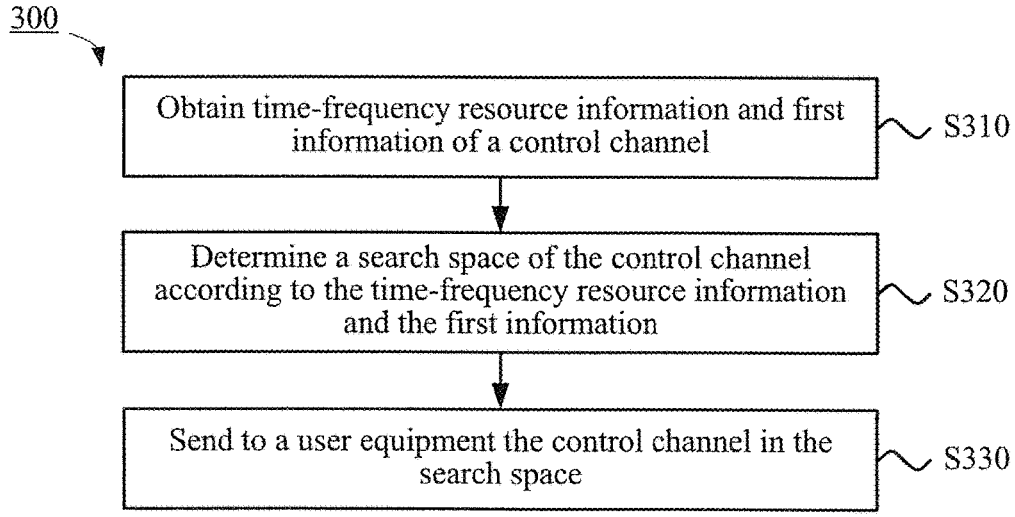
FIG. 6 is another schematic mapping diagram of a search space according to an embodiment of the present invention.
FIG. 7 is a schematic flowchart of a method for sending a control channel according to another embodiment of the present invention.

Optionally, the second signaling may be high-layer signaling, such as RRC signaling or MAC signaling, and may also be physical layer signaling, such as PDCCH signaling. The UE may obtain, by using the second signaling, the first mapping relationship and/or the second mapping relationship, and the UE may also obtain, by using an implicit rule, the first mapping relationship and/or the second mapping relationship. For example, as shown in FIG. 5, a search space corresponding to an antenna port 7 occupies a part of time-frequency resources in RB pairs 0, 1, 2, N−3, N−2 and N−1; and a search space corresponding to an antenna port 8 occupies another part of time-frequency resources of the foregoing RB pairs. In another example, as shown in FIG. 6, the search space corresponding to the antenna port 7 occupies time-frequency resources of first timeslots in RB pairs 0, 1, and 2, and the search space corresponding to the antenna port 8 occupies time-frequency resources of second timeslots in RB pairs 0, 1, and 2. In this case, if the antenna port 7 is configured for the UERS of the UE, the UE may obtain, according to the foregoing implicit rule, a search space corresponding to the antenna port 7.

In the embodiment of the present invention, the user equipment may also determine the search space of the control channel according to a third mapping relationship between the time-frequency resource information, the first information and the search space, the time-frequency resource information, and the first information.

In the embodiment of the present invention, optionally, the first mapping relationship between the time-frequency resource information and the search space, the second mapping relationship between the configuration information and the search space, or the third mapping relationship between the time-frequency resource information, the configuration information and the search space is a user equipment-specific mapping relationship. That is, for different user equipment's, the first mapping relationship or the second mapping relationship varies.

In the embodiment of the present invention, the search space of the control channel determined by the user equipment may be distinguished by using at least one of the following: a time resource, a frequency resource and a spatial resource.

An aggregation level of 2 RBs is specifically used as an example. As shown in FIG. 6, the search spaces corresponding to the antenna port 7 and the antenna port 8 are distinguished by using time-frequency resources, that is, a search space corresponding to the antenna port 7 occupies a front half of an RB in each of RB pairs 0, 1, and 2, and a rear half of an RB in each of RB pairs N−3, N−2, and N−1; and a search space corresponding to the antenna port 8 occupies a rear half of the RB in each of RB pairs 0, 1, and 2, and a front half of the RB in each of RB pairs N−3, N−2, and N−1.

Particularly, an aggregation level of one RB is used as an example again. As shown in FIG. 5, the search space corresponding to the antenna port 7 occupies a part of time-frequency resources in RB pairs 0, 1, 2, N−3, N−2 and N−1; and the search space corresponding to the antenna port 8 occupies another part of time-frequency resources of the foregoing RB pairs. It may be seen from this example that each candidate E-PDCCH resource at an aggregation level of one RB occupies two parts of one RB, where each part of the RB is a part of an RB frequency division, and the UE is notified by signaling that a minimum unit of a configured time-frequency resource of an E-PDCCH is one RB or one RB pair; therefore, the UE needs to determine a final search space according to correspondence between the configuration information of the UERS and the search space of the E-PDCCH.

Besides, the method for dividing one RB into multiple parts of the RB is not limited herein. Other candidate E-PDCCH resources at an aggregation level greater than one RB may also adopt the mapping method for dividing one RB into multiple parts. Other distinguishing manners of multiple search spaces are also not limited herein, for example, search space A and search space B may occupy the same time-frequency resource, but are distinguished by using spatial information, such as different UERS antenna ports.

In the embodiment of the present invention, optionally, the user equipment determines the search space of the control channel according to the time-frequency resource information and the first information, where at least one control channel in the search space occupies a part of resources of each RB in at least two resource blocks RBs. In this way, a control channel can be increased, and frequency diversity gains of the control channel can be increased particularly when an aggregation level is low.

For example, as shown in FIG. 5, a control channel B occupies a part of resources of a first RB in RB pair 1, where the part of resources may be an upper half of resources of the first RB, for example, an upper half of the RB, or may also be a lower half of resources of the first RB, for example, a lower half of the RB; and the control channel B further occupies a part of resources of a second RB in RB pair N−2, where the part of resources may be an upper half of resources of the second RB, for example, an upper half of the RB, or may also be a lower half of resources of the second RB, for example, a lower half of the RB. As shown in FIG. 6, a control channel C occupies a front half of resources in RB pair 2, and the control channel C further occupies a rear half of resources in RB pair N−1.

In the embodiment of the present invention, optionally, the user equipment determines the search space of the control channel according to the time-frequency resource information and the first information, where at least one control channel in the search space occupies all or a part of resources of at least two RBs, and the at least two RBs occupy a first timeslot and a second timeslot of a subframe. Therefore, resource overheads of the control channel can be balanced, and diversity gains between timeslots can be obtained.

Optionally, if an aggregation level of a control channel is 1, the control channel occupies a part of resources in at least two RBs, where the RB resources are divided in a frequency division manner, and the part of the resources in the at least two RBs is divided in a time division manner, for example, each resource occupies two timeslots. Optionally, RB intervals among the part of the resources in the at least two RBs are the same.

In the embodiment of the present invention, optionally, the user equipment determines the search space of the control channel according to the time-frequency resource information and the first information, where: when a sequence number of an RB or an RB pair occupied by a first part of resources of a first control channel in the search space is i, a sequence number of an RB or an RB pair occupied by a second part of resources of the first control channel is $N+i-N_{can}/M$, where M is a natural number, $N_{can}$ is the number of control channels that are corresponding to an aggregation level and included in the search space of the control channel, and N is the number of RBs or RB pairs corresponding to the time-frequency resource information, or N is equal to $N_{can}$.

Use FIG. 6 as an example, and assume that the number of candidate control channels at an aggregation level of 2 RBs is 6, that is, $N_{can}=6$, and M is set to 2. When a sequence number of an RB pair occupied by a first part of resources of a candidate control channel is 1, a sequence number of an RB pair occupied by a second part of resources of the candidate control channel is N−2.

Therefore, by using the method for receiving the control channel according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

In the embodiment of the present invention, optionally, the user equipment determines the search space of the control channel according to the time-frequency resource information and the first information, and the search space further includes that:

the number of candidate control channels of the current user equipment that are included in a first resource unit occupied by the search space of the control channel is less than or equal to the maximum number of candidate control channels allowed to include in the first resource unit, where the candidate control channel is a candidate control channel at an aggregation level and/or the candidate control channel is a candidate control channel corresponding to configuration information of at least one UERS.

The search space further includes that:

the first resource unit occupied by the search space of the control channel includes all or a part of one candidate control channel of the user equipment, and the candidate control channel is a candidate control channel at an aggregation level and/or the candidate control channel is a candidate control channel corresponding to configuration information of a UERS.

The first resource unit may be an RB, an RB pair, an RB group or an RB pair group. The RB group or RB pair group may be a group of RBs or RB pairs which are used for joint channel estimation and notified by a base station to the user equipment, that is, the base station adopts a same precoding matrix when sending to the user equipment an E-PDCCH in the RB group or RB pair group.

The aggregation level may include 1, 2, 4 or other numbers of first control channel elements, that is, one candidate control channel may be formed by 1, 2, 4 or other numbers of first control channel elements. The first control channel element may be a control channel element (CCE) of a PDCCH in an existing LTE system, and other units may also be used to measure the first control channel element, where the other unit is, for example, one RB, half an RB, a control channel element of other sizes, and the like, which is not limited herein. It is used as an example for description in the following that the aggregation levels are 1 and 2, the first control channel element is a CCE and the first resource unit is one RB pair; other conditions are similar and will not be limited herein.

An example is used for description in the following:

Assume that time-frequency resources of an E-PDCCH which are configured for a UE are 4 RB pairs, specifically represented as RB pairs 0, 1, 2 and 3. In addition, assume that the number of CCEs of the E-PDCCH which are included in one RB pair is 4, and sequence numbers of the CCEs in the 4 RB pairs may be successively assumed as 0, 1, . . . , and 15, altogether 16 CCEs. In addition, assume that the antenna port 7 and scrambling code identifier 0 are configured for the UERS of the UE; and further assume that the numbers of candidate E-PDCCHs of the UE and in search spaces at aggregation levels of 1, 2, and 4 CCEs are all 4, and other aggregation levels, the configuration information of the UERS and the number of candidate E-PDCCHs are not limited herein.

Assume that the search space starts from CCE 0 of RB 0, and if 4 candidate E-PDCCHs of the UE and at an aggregation level of 1 CCE are CCE 0, CCE 1, CCE 2 and CCE 3, E-PDCCH blocking probability will increase. Specifically, if another UE having the same UERS configuration with the UE occupies any one of CCE 0, CCE 1, CCE 2 and CCE 3, the 4 CCEs are all unavailable for the UE because of a UERS conflict, where it is assumed that the UERS of the UE occupies the whole RB pair; on the contrary, if another UE having a UERS configuration different from that of the UE occupies any one of CCE 0, CCE 1, CCE 2 and CCE 3, the other three CCEs not occupied in the 4 CCEs are all available for the UE, because UEs are distinguished by using different UERS configurations. Therefore, it is unnecessary to have a candidate E-PDCCH of the UE occupy an entire RB pair. One solution is that the number of candidate E-PDCCHs of the UE in an RB pair is less than the total number of candidate E-PDCCHs, at a same aggregation level, that can be carried in the RB pair. Specifically, for example, the 4 candidate E-PDCCHs of the UE may separately occupy CCE 0, CCE 1, CCE 4, and CCE 5, and in this way, the foregoing E-PDCCH conflict is alleviated. More preferably, the 4 candidate E-PDCCHs of the UE may separately occupy CCE 0, CCE 4, CCE 8, and CCE 12, that is, for a specified aggregation level and a specified UERS configuration, each RB pair includes only one candidate E-PDCCH of the UE.

Particularly, for a distributed E-PDCCH mapping manner, that is, one candidate E-PDCCH may be mapped to multiple RBs or RB pairs to obtain frequency diversity gains. In this case, similarly, the foregoing solution may be that: for a specified aggregation level and a specified UERS configuration, one RB pair includes only apart of one candidate E-PDCCH of the UE, or one RB pair includes a part of each of N candidate E-PDCCHs of the UE, where N is less than the total number of candidate E-PDCCHs, at a same aggregation level, that can be carried in the RB pair. Specifically, when N is set to 2 as an example, one RB pair includes a part of a first candidate E-PDCCH and a part of a second candidate E-PDCCH, which belong to the UE and are at an aggregation level of 1 CCE; and the number of candidate E-PDCCHs, at the aggregation level, that can be carried in the RB pair is 4.

The foregoing assumed conditions are further used to consider a search space of an E-PDCCH at an aggregation level of 2 CCEs. Specifically, for an E-PDCCH at an aggregation level of 2 CCEs, the 4 candidate E-PDCCHs of the UE may separately occupy CCE {0,1}, CCE {4,5}, CCE {8,9} and CCE {12,13}, that is, the number of candidate E-PDCCHs included in one RB pair is also less than the total number of candidate E-PDCCHs that can be carried in the RB pair, or further, one RB pair includes all or a part of one candidate E-PDCCH at most.

The foregoing assumed conditions are further used to consider a search space of an E-PDCCH at an aggregation level of 4 CCEs. Specifically, for an E-PDCCH at an aggregation level of 4 CCEs, the 4 candidate E-PDCCHs of the UE may separately occupy RB pair 0, RB pair 1, RB pair 2 and RB pair 3, that is, the number of candidate E-PDCCHs included in one RB pair is equal to the number of candidate E-PDCCHs, at the aggregation level, that can be carried in the RB pair.

The specific control channel element that is occupied by the UE in one RB pair to search for a candidate E-PDCCH of the UE may be determined by using the first information in the foregoing embodiment. It is used as an example for description that the first information is the configuration information of the UERS. The control channel element occupied by the UE in one RB pair has correspondence with the configuration information of the UERS of the UE, and the control channel element specifically occupied by the UE in one RB pair to search for a candidate E-PDCCH of the UE can be determined by using the correspondence and the configuration information of the UERS of the UE.

The foregoing embodiments may be extended to a base station side:

A method for sending a control channel includes:

obtaining time-frequency resource information and first information of the control channel;

determining a search space of the control channel according to the time-frequency resource information and the first information; and sending to a user equipment the control channel in the search space.

The number of candidate control channels of the current user equipment that are included in a first resource unit occupied by the search space of the control channel is less than or equal to the maximum number of candidate control channels allowed to include in the first resource unit, where the candidate control channel is a candidate control channel at an aggregation level and/or the candidate control channel is a candidate control channel corresponding to configuration information of a UERS.

The method further includes that:

the first resource unit occupied by the search space of the control channel includes all or a part of one candidate control channel of the current user equipment at most, where the candidate control channel is a candidate control channel at an aggregation level and/or the candidate control channel is a candidate control channel corresponding to configuration information of a UERS.

A user equipment includes:

an obtaining module, configured to obtain time-frequency resource information and first information of a control channel;

a determining module, configured to determine a search space of the control channel according to the time-frequency resource information and the first information obtained by the obtaining module; and a first receiving module, configured to receive the control channel in the search space determined by the determining module.

The determining module includes that:

the number of candidate control channels of the current user equipment that are included in a first resource unit occupied by the search space of the control channel is less than or equal to the maximum number of candidate control channels allowed to include in the first resource unit, where the candidate control channel is a candidate control channel at an aggregation level and/or the candidate control channel is a candidate control channel corresponding to configuration information of a UERS.

The determining module further includes that:

the first resource unit occupied by the search space of the control channel includes all or a part of one candidate control channel of the user equipment, where the candidate control channel is a candidate control channel at an aggregation level and/or the candidate control channel is a candidate control channel corresponding to configuration information of a UERS.

A base station includes:

an obtaining module, configured to obtain time-frequency resource information and first information of a control channel;

a determining module, configured to determine a search space of the control channel according to the time-frequency resource information and the first information obtained by the obtaining module; and a first sending module, configured to send to a user equipment the control channel in the search space determined by the determining module.

The determining module includes that:

the number of candidate control channels of the user equipment that are included in a first resource unit occupied by the search space of the control channel is less than or equal to the maximum number of candidate control channels allowed to include in the first resource unit, where the candidate control channel is a candidate control channel at an aggregation level and/or the candidate control channel is a candidate control channel corresponding to configuration information of a UERS.

The determining module further includes that:

the first resource unit occupied by the search space of the control channel includes all or a part of one candidate control channel of the user equipment, where the candidate control channel is a candidate control channel at an aggregation level and/or the candidate control channel is a candidate control channel corresponding to configuration information of a UERS.

Figure 8A:
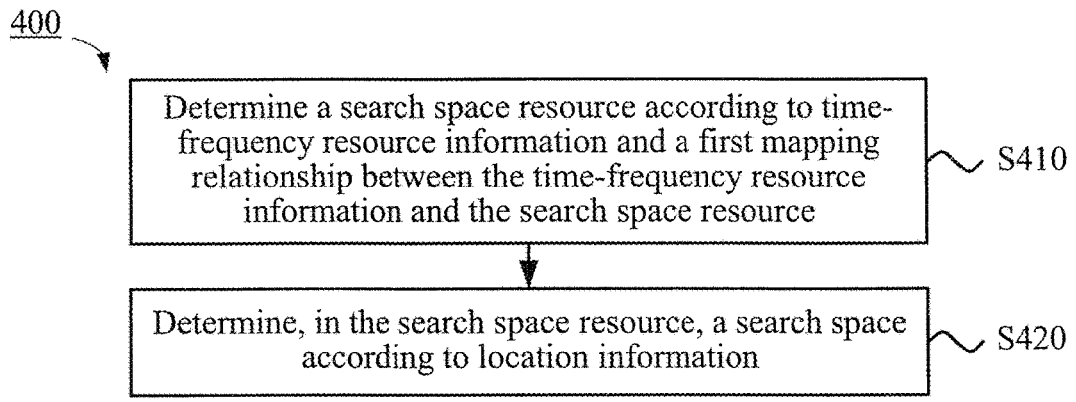
FIG. 8A and FIG. 8B are each a schematic flowchart of a method for determining a search space according to another embodiment of the present invention.
Figure 8B:
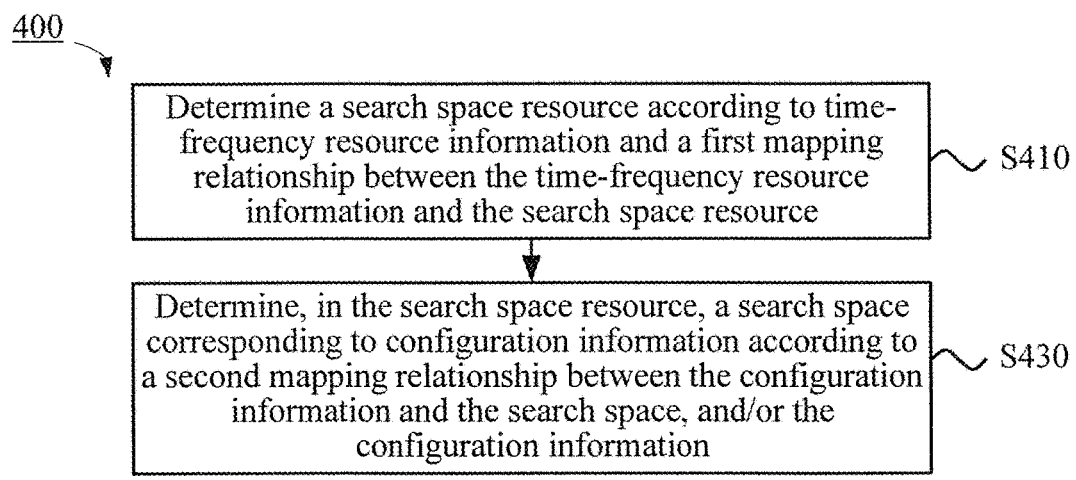

The foregoing describes, with reference to FIG. 2 to FIG. 6, the method for receiving the control channel according to the embodiments of the present invention in detail from the perspective of a user equipment, and the following will describe, with reference to FIG. 7, FIG. 8A and FIG. 8B, a method for sending control information according to an embodiment of the present invention from the perspective of a base station.

FIG. 7 is a schematic flowchart of a method 300 for sending a control channel according to an embodiment of the present invention. As shown in FIG. 7, the method 300 includes:

S310: Obtain time-frequency resource information and first information of the control channel.

S320: Determine a search space of the control channel according to the time-frequency resource information and the first information.

S330: Send to a user equipment the control channel in the search space.

Therefore, by using the method for sending the control channel according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

In the embodiment of the present invention, before configuring a time-frequency resource and the first information of the control channel for the UE, the base station needs to obtain the time-frequency resource, and configuration information of a UERS and/or location information of the search space included in the first information. For configuration on the time-frequency resource of the control channel of the UE, the base station may configure the control channel of the UE to a time-frequency resource with a good channel state according to a channel state of the UE, or the base station may also configure the time-frequency resource according to an interference condition of a neighboring cell. For configuration on the configuration information of the UERS of the UE, the base station may select the number of antenna ports of the UE according to a channel state of the UE, and coordinate a corresponding antenna port number and scrambling code information according to conditions of multiple UEs in the cell. For configuration on the location information of the search space of the UE, the base station may perform the configuration according to the time-frequency resource of the control channel of the UE, the configuration information of the UERS and/or a load condition on the time-frequency resource.

In the embodiment of the present invention, the base station may send first signaling to the user equipment, where the first signaling includes the time-frequency resource information and the first information, so that the user equipment determines the search space of the control channel according to the time-frequency resource information and the first information. Optionally, the time-frequency resource information and the first information may also be configured for the user equipment statically.

In the embodiment of the present invention, optionally, the first information includes the configuration information of the user equipment-specific reference signal UERS, and/or the location information of the search space, where the configuration information of the UERS is used for sending the control channel.

In the embodiment of the present invention, the base station may determine the search space of the control channel according to the time-frequency resource information and the first information. Optionally, in the embodiment of the present invention, the base station may determine the search space of the control channel according to the time-frequency resource information, a first mapping relationship between the time-frequency resource information and a search space resource, and the location information; and the base station may also determine the search space corresponding to the configuration information according to the time-frequency resource information, the first mapping relationship between the time-frequency resource information and the search space resource, and the configuration information. Descriptions are given below with reference to FIG. 8A and FIG. 8B separately.

In the embodiment of the present invention, as shown in FIG. 8A, optionally, a method 400 for determining, by the base station, the search space of the control channel includes:

S410: The base station determines a search space resource according to the time-frequency resource information and a first mapping relationship between the time-frequency resource information and the search space resource.

S420: The base station determines, in the search space resource, the search space of the control channel according to the location information.

As shown in FIG. 8B, the method 400 for determining the search space of the control channel according to an embodiment of the present invention may also include:

S410: The base station determines a search space resource according to the time-frequency resource information and a first mapping relationship between the time-frequency resource information and the search space resource.

S430: The base station determines, in the search space resource, the search space corresponding to the configuration information according to a second mapping relationship between the configuration information and the search space, and/or the configuration information.

In the embodiment of the present invention, optionally, the base station sends second signaling to the user equipment, where the second signaling includes the first mapping relationship and/or the second mapping relationship so that the user equipment determines the search space of the control channel.

In the embodiment of the present invention, optionally, the base station may also determine the search space of the control channel according to a third mapping relationship between the time-frequency resource information, the first information and the search space, the time-frequency resource information, and the first information.

In the embodiment of the present invention, optionally, the first mapping relationship between the time-frequency resource information and the search space, the second mapping relationship between the configuration information and the search space, or the third mapping relationship between the time-frequency resource, the configuration information and the search space is a user equipment-specific mapping relationship. That is, for different user equipment, the first mapping relationship or the second mapping relationship varies.

In the embodiment of the present invention, optionally, the search space of the control channel determined by the base station may be distinguished by using at least one of the following: a time resource, a frequency resource and a spatial resource. Search spaces occupy the same time-frequency resource in a spatial division manner, thereby increasing utilization of the resource.

In the embodiment of the present invention, optionally, the base station determines the search space of the control channel according to the time-frequency resource information and the first information, where at least one control channel in the search space occupies a part of resources of each RB in at least two resource blocks RBs.

In the embodiment of the present invention, optionally, the base station determines the search space of the control channel according to the time-frequency resource information and the first information, where at least one control channel in the search space occupies all or a part of resources of at least two RBs, and the at least two RBs occupy a first timeslot and a second timeslot of a subframe. Therefore, resource overheads of the control channel can be balanced, and diversity gains between the timeslots can be obtained.

Optionally, if an aggregation level of a control channel is 1, the control channel occupies a part of resources in at least two RBs, where the RB resources are divided in a frequency division manner, and the part of the resources in the at least two RBs is divided in a time division manner, for example, each resource occupies two timeslots. Optionally, RB intervals among the part of the resources in the at least two RBs are the same.

In the embodiment of the present invention, optionally, the base station determines the search space of the control channel according to the time-frequency resource information and the first information, where: when a sequence number of an RB occupied by a first part of resources of a first control channel in the search space is i, a sequence number of an RB occupied by a second part of resources of the first control channel is $N+i-N_{can}/M$, where M is a natural number, $N_{can}$ is the number of control channels that are corresponding to an aggregation level and included in the search space of the control channel, and N is the number of RBs or RB pairs corresponding to the time-frequency resource information, or N is equal to $N_{can}$.

Therefore, by using the method for sending the control channel according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

The foregoing describes, with reference to FIG. 2 to FIG. 8B, the methods for receiving and sending the control channel according to the embodiments of the present invention in detail, and the following will describe, with reference to FIG. 9 to FIG. 16B, a user equipment and a base station according to embodiments of the present invention in detail.

Figure 9:
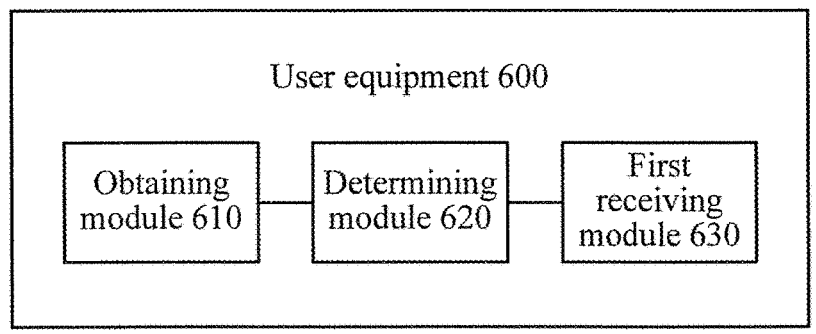
FIG. 9 is a schematic block diagram of a user equipment according to an embodiment of the present invention.

FIG. 9 is a schematic block diagram of a user equipment 600 according to an embodiment of the present invention. As shown in FIG. 9, the user equipment 600 includes:

an obtaining module 610, configured to obtain time-frequency resource information and first information of a control channel;

a determining module 620, configured to determine a search space of the control channel according to the time-frequency resource information and the first information obtained by the obtaining module 610; and a first receiving module 630, configured to receive the control channel in the search space determined by the determining module 620.

By using the user equipment according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

Figure 10:
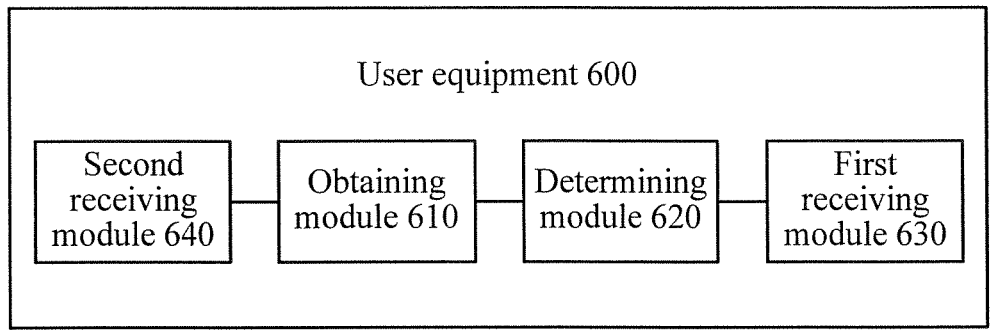
FIG. 10 is another schematic block diagram of a user equipment according to an embodiment of the present invention.

Optionally, as shown in FIG. 10, the user equipment 600 further includes:

a second receiving module 640, configured to receive first signaling sent by abase station, where the first signaling includes the time-frequency resource information and the first information; and the obtaining module 610 is further configured to obtain the time-frequency resource information and the first information according to the first signaling received by the second receiving module 640.

In the embodiment of the present invention, optionally, the first information obtained by the obtaining module 610 includes configuration information of a user equipment-specific reference signal UERS, and/or location information of the search space, where the configuration information of the UERS is used for receiving the control channel.

Figure 11:
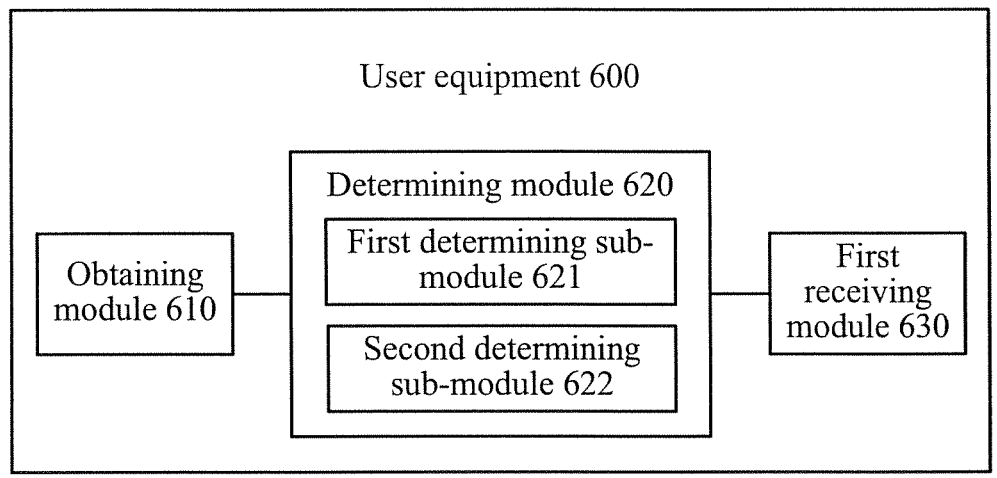
FIG. 11 is still another schematic block diagram of a user equipment according to an embodiment of the present invention.

Optionally, as shown in FIG. 11, the determining module 620 includes:

a first determining sub-module 621, configured to determine the search space according to the time-frequency resource information, a first mapping relationship between the time-frequency resource information and a search space resource, and the location information.

Optionally, as shown in FIG. 11, the determining module 620 further includes:

a second determining sub-module 622, configured to determine the search space corresponding to the configuration information according to the time-frequency resource information, the first mapping relationship between the time-frequency resource information and the search space resource, and the configuration information.

Figure 12A:
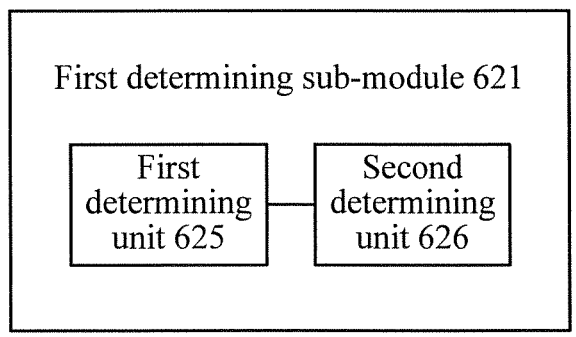
FIG. 12A is a schematic block diagram of a first determining sub-module according to an embodiment of the present invention.

In the embodiment of the present invention, optionally, as shown in FIG. 12A, the first determining sub-module 621 includes:

a first determining unit 625, configured to determine the search space resource according to the time-frequency resource information and the first mapping relationship; and a second determining unit 626, configured to determine, according to the location information, the search space in the search space resource determined by the first determining unit 625.

Figure 12B:
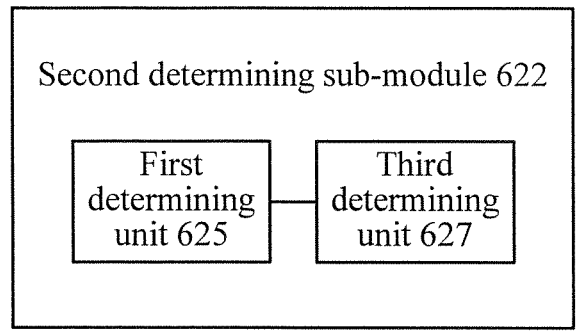
FIG. 12B is a schematic block diagram of a second determining sub-module according to an embodiment of the present invention.

In the embodiment of the present invention, optionally, as shown in FIG. 12B, the second determining sub-module 622 includes:

a first determining unit 625, configured to determine the search space resource according to the time-frequency resource information and the first mapping relationship; and a third determining unit 627, configured to determine, in the search space resource determined by the first determining unit 625, the search space corresponding to the configuration information according to a second mapping relationship between the configuration information and the search space, and/or the configuration information.

In the embodiment of the present invention, optionally, the first mapping relationship or the second mapping relationship used by the determining module 620 for implementation is a user equipment-specific mapping relationship.

In the embodiment of the present invention, optionally, the determining module 620 is further configured to: determine the search space according to the time-frequency resource information and the first information, where at least one control channel in the search space occupies a part of resources of each RB in at least two resource blocks RBs.

In the embodiment of the present invention, optionally, the determining module 620 is further configured to: determine the search space according to the time-frequency resource information and the first information, where at least one control channel in the search space occupies all or a part of resources of at least two RBs, and the at least two RBs occupy a first timeslot and a second timeslot of a subframe.

In the embodiment of the present invention, optionally, the determining module 620 is further configured to: determine the search space according to the time-frequency resource information and the first information, where: when a sequence number of an RB occupied by a first part of resources of a first control channel in the search space is i, a sequence number of an RB occupied by a second part of resources of the first control channel is $N+i-N_{can}/M$, where M is a natural number, $N_{can}$ is the number of control channels that are corresponding to an aggregation level and included in the search space of the control channel, and N is the number of RBs or RB pairs corresponding to the time-frequency resource information, or N is equal to $N_{can}$.

Optionally, if an aggregation level of a control channel is 1, the control channel occupies a part of resources in at least two RBs, where the RB resources are divided in a frequency division manner, and the part of the resources in the at least two RBs is divided in a time division manner, for example, each resource occupies two timeslots. Optionally, RB intervals among the part of the resources in the at least two RBs are the same.

It should be understood that the user equipment 600 according to the embodiment of the present invention may correspond to the user equipment UE in the methods for receiving and sending the control channel according to the embodiments of the present invention; besides, the foregoing and other operations and/or functions of the modules in the user equipment 600 are separately used to implement the corresponding processes of the methods shown in FIG. 2 to FIG. 6, and are not repeated herein for the purpose of brevity.

Therefore, by using the user equipment according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

Figure 13:
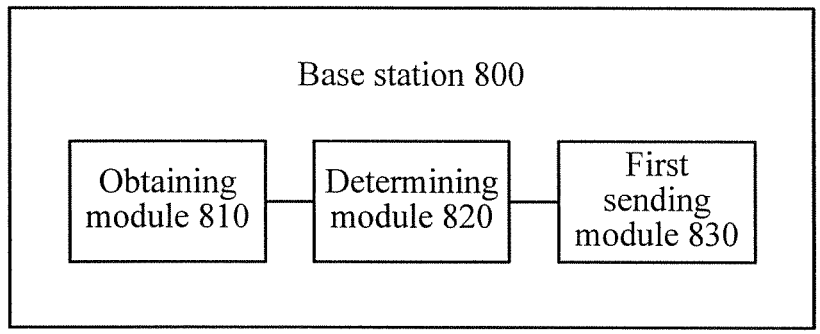
FIG. 13 is a schematic block diagram of a base station according to an embodiment of the present invention.

FIG. 13 is a schematic block diagram of a base station 800 according to an embodiment of the present invention. As shown in FIG. 13, the base station 800 includes:

an obtaining module 810, configured to obtain time-frequency resource information and first information of a control channel;

a determining module 820, configured to determine a search space of the control channel according to the time-frequency resource information and the first information obtained by the obtaining module 810; and a first sending module 830, configured to send to a user equipment the control channel in the search space determined by the determining module 820.

By using the base station according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

Figure 14:
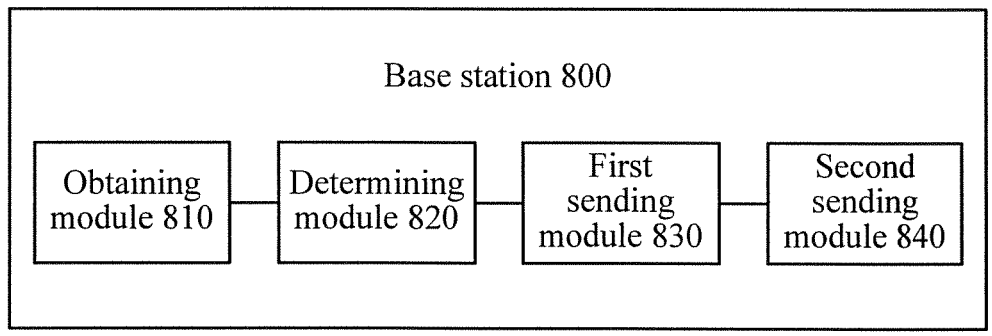
FIG. 14 is another schematic block diagram of a base station according to an embodiment of the present invention.

In the embodiment of the present invention, optionally, as shown in FIG. 14, the base station 800 further includes:

a second sending module 840, configured to send first signaling to the user equipment, where the first signaling includes the time-frequency resource information and the first information, so that the user equipment determines the search space of the control channel according to the time-frequency resource information and the first information.

In the embodiment of the present invention, optionally, the first information obtained by the obtaining module 810 includes configuration information of a user equipment-specific reference signal UERS, and/or location information of the search space, where the configuration information of the UERS is used for sending the control channel.

Figure 15:
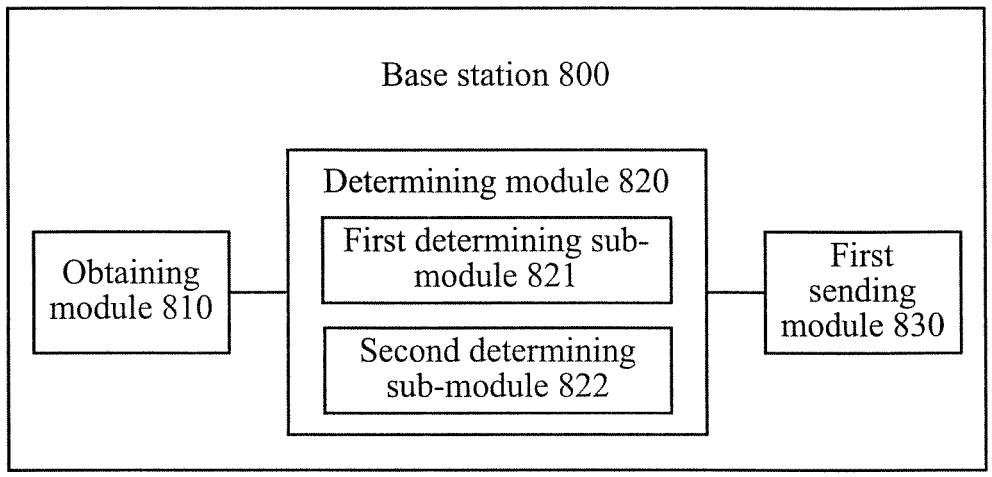
FIG. 15 is still another schematic block diagram of a base station according to an embodiment of the present invention.

In the embodiment of the present invention, optionally, as shown in FIG. 15, the determining module 820 includes:

a first determining sub-module 821, configured to determine the search space according to the time-frequency resource information, a first mapping relationship between the time-frequency resource information and a search space resource, and the location information.

Optionally, as shown in FIG. 15, the determining module 820 further includes:

a second determining sub-module 822, configured to determine the search space corresponding to the configuration information according to the time-frequency resource information, the first mapping relationship between the time-frequency resource information and the search space resource, and the configuration information.

Figure 16A:
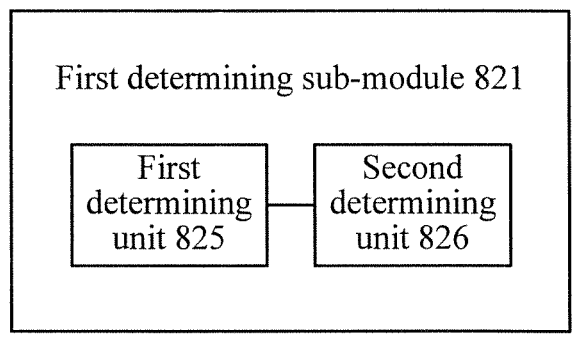
FIG. 16A is a schematic block diagram of a first determining sub-module according to an embodiment of the present invention.
Figure 16B:
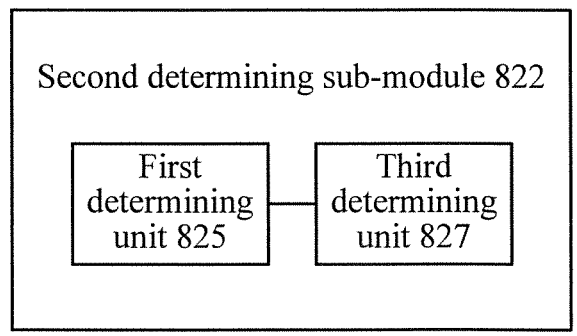
FIG. 16B is a schematic block diagram of a second determining sub-module according to an embodiment of the present invention.

In the embodiment of the present invention, optionally, as shown in FIG. 16A, the first determining sub-module 821 includes:

a first determining unit 825, configured to determine the search space resource according to the time-frequency resource information and the first mapping relationship; and a second determining unit 826, configured to determine, according to the location information, the search space in the search space resource determined by the first determining unit 825.

In the embodiment of the present invention, optionally, as shown in FIG. 16A, the second determining sub-module 822 includes:

a first determining unit 825, configured to determine the search space resource according to the time-frequency resource information and the first mapping relationship; and a third determining unit 827, configured to determine, in the search space resource determined by the first determining unit 825, the search space corresponding to the configuration information according to a second mapping relationship between the configuration information and the search space, and/or the configuration information.

Optionally, the base station 800 further includes: a third sending module, configured to send second signaling to the user equipment, where the second signaling includes the first mapping relationship and/or the second mapping relationship so that the user equipment determines the search space of the control channel.

Optionally, the determining module 820 is further configured to determine the search space of the control channel according to a third mapping relationship between the time-frequency resource information, the first information and the search space, the time-frequency resource information, and the first information. In the embodiment of the present invention, optionally, the first mapping relationship, the second mapping relationship or the third mapping relationship used by the determining module 820 for implementation is a user equipment-specific mapping relationship.

In the embodiment of the present invention, optionally, the determining module 820 is further configured to: determine the search space according to the time-frequency resource information and the first information, where at least one control channel in the search space occupies a part of resources of each RB in at least two resource blocks RBs.

In the embodiment of the present invention, optionally, the determining module 820 is further configured to: determine the search space according to the time-frequency resource information and the first information, where at least one control channel in the search space occupies all or a part of resources of the at least two RBs, and the at least two RBs occupy a first timeslot and a second timeslot of a subframe.

In the embodiment of the present invention, optionally, the determining module 820 is further configured to: determine the search space according to the time-frequency resource information and the first information, where: when a sequence number of an RB occupied by a first part of resources of a first control channel in the search space is i, a sequence number of an RB occupied by a second part of resources of the first control channel is $N+i-N_{can}/M$, where M is a natural number, $N_{can}$ is the number of control channels that are corresponding to an aggregation level and included in the search space of the control channel, and N is the number of RBs or RB pairs corresponding to the time-frequency resource information, or N is equal to $N_{can}$.

Optionally, if an aggregation level of a control channel is 1, the control channel occupies a part of resources in at least two RBs, where the RB resources are divided in a frequency division manner, and the part of the resources in the at least two RBs is divided in a time division manner, for example, each resource occupies two timeslots. Optionally, RB intervals among the part of the resources in the at least two RBs are the same.

It should be understood that the base station 800 according to the embodiment of the present invention may correspond to the base station eNB in the methods for receiving and sending the control channel according to the embodiments of the present invention; besides, the foregoing and other operations and/or functions of the modules in the base station 800 are separately used to implement the corresponding processes of the methods shown in FIG. 7 and FIG. 8, and are not repeated herein for the purpose of brevity.

Therefore, by using the base station according to the embodiment of the present invention, the search space of the control channel can be determined according to the time-frequency resource information and the first information of the control channel, so that receiving and sending of the control channel can be implemented and a capacity of the control channel can be expanded, thereby improving system scheduling efficiency and flexibility and further improving user experience.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed to a plurality of network units. Some or all of the units may be selected to achieve the objective of the solution of the embodiment of the present invention according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any equivalent modification or replacement readily figured out by a person skilled in the art within the technical scope of the present invention shall fall within the protection scope of the present invention. Therefore, the protection scope of the present invention shall be subject to the protection scope of the claims.

What is claimed is:

1. A method for receiving a control channel, the method comprising:
    obtaining, by a terminal device, time-frequency resource information of the control channel and location information of a search space;
    determining, by the terminal device, the search space according to the time-frequency resource information and the location information, wherein the search space includes multiple candidate control channels for an aggregation level, for the aggregation level and one antenna port number, each first resource unit occupied by the search space includes all or a part of at most one candidate control channel at the aggregation level, for one or more first resource units in all first resource units occupied by the search space, each of the one or more first resource units includes all or a part of one candidate control channel at the aggregation level, the one candidate control channel corresponds to configuration information of one UE-specific reference signal (UERS), and the configuration information of one UERS includes the one antenna port number; and
    receiving, by the terminal device, the control channel in the search space.

2. The method according to claim 1, wherein the first resource unit includes one of a resource block, a resource block pair, a resource block group, and a resource block pair group.

3. The method according to claim 1, wherein determining the search space of the control channel comprises:
    determining, by the terminal device, a search space resource according to the time-frequency resource information and a first mapping relationship between the time-frequency resource information and the search space resource, wherein the time-frequency resource includes the search space resource; and
    determining, by the terminal device, in the search space resource, the search space corresponding to the location information.

4. A method for sending a control channel, the method comprising:
    obtaining, by a base station, time-frequency resource information of the control channel and location information of a search space;
    determining, by the base station, the search space according to the time-frequency resource information and the location information, wherein the search space includes multiple candidate control channels for an aggregation level, for the aggregation level and one antenna port number, each first resource unit occupied by the search space includes all or a part of at most one candidate control channel at the aggregation level, for one or more first resource units in all first resource units occupied by the search space, each of the one or more first resource units includes all or a part of one candidate control channel at the aggregation level, the one candidate control channel corresponds to configuration information of one UE-specific reference signal (UERS), and the configuration information of one UERS includes the one antenna port number; and sending, by the base station, to a terminal device the control channel in the search space.

5. The method according to claim 4, wherein the first resource unit includes one of a resource block, a resource block pair, a resource block group, and a resource block pair group.

6. The method according to claim 4, wherein determining the search space of the control channel comprises:

determining, by the base station, a search space resource according to the time-frequency resource information and a first mapping relationship between the time-frequency resource information and the search space resource, and the location information; and determining, by the base station, in the search space resource, the search space according to the location information.

7. A terminal device, comprising a receiver and a processor coupled to a memory comprising instructions that, when executed by the processor, cause the terminal device to:

obtain time-frequency resource information of a control channel and location information of a search space;

determine the search space according to the time-frequency resource information and the location information, wherein the search space includes multiple candidate control channels for an aggregation level, for the aggregation level and one antenna port number, each first resource unit occupied by the search space includes all or a part of at most one candidate control channel at the aggregation level, for one or more first resource units in all first resource units occupied by the search space, each of the one or more first resource units includes all or a part of one candidate control channel at the aggregation level, the one candidate control channel corresponds to configuration information of one UE-specific reference signal (UERS), and the configuration information of one UERS includes the one antenna port number; and receive the control channel in the search space.

8. The terminal device according to claim 7, wherein the first resource unit includes one of a resource block, a resource block pair, a resource block group, and a resource block pair group.

9. The terminal device according to claim 7, wherein the memory further comprises instructions that, when executed by the processor, cause the terminal device to:

determine a search space resource according to the time-frequency resource information and a first mapping relationship between the time-frequency resource information and the search space resource, wherein the time-frequency resource includes the search space resource; and determine, in the search space resource, the search space corresponding to the location information.

10. A base station, comprising a transmitter and a processor coupled to a memory comprising instructions that, when executed by the processor, cause the base station to:

obtain time-frequency resource information of a control channel and location information of a search space;

determine the search space according to the time-frequency resource information and the location information, wherein the search space includes multiple candidate control channels for an aggregation level, for the aggregation level and one antenna port number, each first resource unit occupied by the search space includes all or a part of at most one candidate control channel at the aggregation level, for one or more first resource units in all first resource units occupied by the search space, each of the one or more first resource units includes all or a part of one candidate control channel at the aggregation level, the one candidate control channel corresponds to configuration information of one UE-specific reference signal (UERS), and the configuration information of one UERS includes the one antenna port number; and send to a terminal device the control channel in the search space.

11. The base station according to claim 10, wherein the first resource unit includes one of a resource block, a resource block pair, a resource block group, and a resource block pair group.

12. The base station according to claim 10, wherein the memory further comprises instructions that, when executed by the processor, cause the base station to:

determine a search space resource according to the time-frequency resource information and a first mapping relationship between the time-frequency resource information and the search space resource, and the location information; and determine, in the search space resource, the search space according to the location information.

* * * * *